United States Patent [19]

O'Connell

[11] 4,022,257
[45] May 10, 1977

[54] FUNNEL-DRAINER DEVICE

[76] Inventor: Daniel J. O'Connell, 5906 Colfax, North Hollywood, Calif. 91601

[22] Filed: Dec. 15, 1975

[21] Appl. No.: 640,559

[52] U.S. Cl. .............................. 141/98; 141/314; 141/340; 141/391; 210/474; 184/1.5; 184/106

[51] Int. Cl.² ........................................ B65B 3/06

[58] Field of Search ................ 220/1 C, 63 R; 229/14 B, 14 BE, 14 BA; 206/223; 184/1.5, 106; 141/313–317, 391, 114, 98, 10, 106, 108, 109, 364, 372, 286; 4/110, 112; 210/474, 477

[56] References Cited

UNITED STATES PATENTS 3,703,956  11/1972  Oswaut ........................ 206/223

FOREIGN PATENTS OR APPLICATIONS 1,269,430  5/1968  Germany ....................... 184/106

OTHER PUBLICATIONS

Popular Mechanics, June 1975, p. 86.

Primary Examiner—Houston S. Bell, Jr.
Attorney, Agent, or Firm—Spensley, Horn & Lubitz

[57] ABSTRACT

A funnel-drainer device for collecting waste liquids and the like is disclosed. The device comprises a continuous side wall defining a container having a vertical axis. The container has an inlet adapted to receive the liquid which inlet is disposed along the vertical axis, and an outlet which is disposed through the side wall of the container. A removable receptacle is selectively coupled to the container adjacent the outlet such that the waste liquid and the like flows through said inlet into said container and exits through the outlet into the receptacle. After the waste liquid has been collected, the receptacle is then removed and the liquid is disposed of in an ecologically acceptable manner.

8 Claims, 5 Drawing Figures

FUNNEL-DRAINER DEVICE

BACKGROUND OF THE INVENTION

1. Field of the Invention

The present invention relates to the filed of means for collecting waste liquids and the like, and more specifically, to an inverted frustum container and a removable receptacle coupled thereto for collecting waste liquids.

2. Prior Art

Various devices are well known which have utility as a means for containing waste material. For example, waste paper baskets, waste barrels, and the like have been used, many of which contain an interliner for holding the waste material. An example of a waste bag holder is disclosed by Berner, et al. U.S. Pat. No. 2,759,695. The Berner, et al. device comprises a bag holder having an open upper end to receive a bag and a lower end to eject the same. The means used to support the bag are generally U-shaped straps depending from the rim and having a base portion. The bag is inserted downwardly through the rim with the U-shaped straps holding the bag in position. Such a device, while perhaps acceptable for waste paper, is not acceptable for waste liquid in that (i) no means is provided for directing the liquid into the bag; (ii) no means is provided which could hold liquid, such as oil, without falling apart; (iii) no means is provided for adequately securing the top of the bag to the holder; and (iv) the device is not adapted to be used in tightly confined areas.

Another type of bag holder is disclosed by Bumgarner, et al. U.S. Pat. No. 3,352,520. The Bumgarner, et al. bag holder is comprised of a tripod-like structure having a rim member for holding the top of the bag and a generally triangular base. The bag is inserted through the rim member and is stretched over the rim and is frictionally engaged thereby. While such waste container holder may useful for the containing and disposal of waster paper and the like, such device is not specifically designed for the use of containing waste liquids such as oil and, because of the configuration, is not adopted to direct waste liquids into a separate and distinct receptacle. Moreover, such bag holders would still prevent the bags from being used to collect waste liquid from tightly contained areas.

Today the disposal of waste materials and especially waste liquids is becoming critically important. This is due primarily to the ecological effects of improper disposal of waste liquids, such as, for example, oil and the like. These materials have found their way into streams, lakes and agricultural land and have polluted much of the environment. Liquids are especially dangerous to the ecology because many people improperly dispose of such liquids by merely pouring them down the drain or into the ground. The liquids are then free to permeate either a lake or the ground to a much larger extent than if a piece of paper of other article of waste was disgarded. Accoringly, there has been a long-felt need for means which would prevent the improper disposal of waste liquids.

In conjunction with the ecological problems of disposal of waste liquids, the cost of oil, and oil derivatives has increased significantly in recent years. These cost increases, while due to many factors, have as their effect increased the desirability of recycling used petroleum products such as oil and oil base liquids so as to decrease the dependence on foreign oil and to fully utilize existing supplies of oil without generating waste. One such supply of used oil has been from gas stations where millions of cars each year have their oil changed. This used oil, which at one time was merely disgarded, has now become a valuable asset of such gas stations which sell it to recyclers who then convert the oil into other products or purify it and resell it back to the gas stations for use once again as lubrication for cars.

The cost of oil has risen to such an extent that for those individuals who drain their own cars or otherwise have access to used oil can now realize a significant amount of money by bringing such petroleum products to a recyling center and either obtaining fresh recycled oil or being paid money for their used oil. Moreover, this disposal system is clearly preferable to merely dumping the oil on the ground or down the drain where such is likely to have an adverse effect on the ecology. Thus, there is a need for a device which can be used to collect the oil in such a manner that it can be contained and used to transport the oil from the car engine or other device to the recycling center. Such device should have the additional advantage of being reusable. Moreover, such device should be usable in tightly confined areas and direct the oil into a receptacle.

The present invention represents an advancement in the art of liquid waste containers and has many advantages not associated with prior art devices. The present invention provides a device which may be used to collect oil and other waste liquids and which permits the collected liquid to be easily transported from the place where it is obtained to the place where it can be properly disposed of.

BRIEF SUMMARY OF THE INVENTION

The present invention relates to receptacles used for draining of liquids, and more specifically, to a funnel-like device and an associated receptacle for containing the waste liquids. The device comprises a continuous side wall defining an open top member and a closed bottom member, and an opening disposed through the side wall adjacent the bottom member. A bag-like receptacle having a first section exterior to the container and a second section within the container extends through the opening, up the interior of the container to the top member. The receptacle and the opening are arranged and configured such that when a liquid flows into the container the liquid exits out of the opening and into the exterior section of the bag. A cover member is coupled with the container adjacent the top thereof and has a plurality of openings of a predetermined size such that material of a specific size is prevented from entering the container. In this manner, only liquids, or liquids containing small size particles are collected in the removable bag-like receptacle. The cover member also secures the bag-like receptacle to the container.

To use the device of the present invention, the bag-like receptacle is inserted through the opening adjacent the closed bottom member of the container and is extended up and over the top member of the container so as to form a lining therein. The cover member is then disposed over the bag-like receptacle top member so as to securely hold the bag-like receptacle in position. The device is then inserted, in a typical situation, underneath the oil pan of an automobile. The oil drain is removed from the oil pan and the oil is permitted to drain into the container. Because the cover member is in the shape of a grate-like lid, any nuts, bolts or other objects which the user does not want to dispose of will be prevented from entering into the container and thus, also prevented from entering into the bag-like receptacle. After the oil has substantially drained into the device, the device is removed from underneath the automobile. Inasmuch as the container is arranged and configured so as to encourage the liquid to flow through the container and into the bag-like receptacle, substantially all the liquid is now in the exterior section of the receptacle. The cover member is removed and the interior section of the of the bag, which lines the interior of the container, is removed out of the opening in the container. The bag, which has been closed in an appropriate fashion contains the oil and may then be taken to a place where it can be disposed of properly and preferably recycled. Thus, by the use of the instant invention, an easy to use means for draining and containing waste liquids is disclosed.

Another object of the instant invention is to provide a device for collecting waste liquids and the like which is reusable and which is relatively inexpensive to manufacture.

The novel features which are believed to be characteristic of the invention, both as its organization and its method of operation, together with further objectives and advantages thereof will be better understood from the following description considered in connection with the accompanying drawing in which a presently preferred embodiment of the invention is illustrated by way of example. It is to be expressly understood, however, that the drawings are for the purpose of illustration and description only and are not intended as a definition of the limits of the invention.

DETAILED DESCRIPTION OF THE INVENTION

Figure 1:
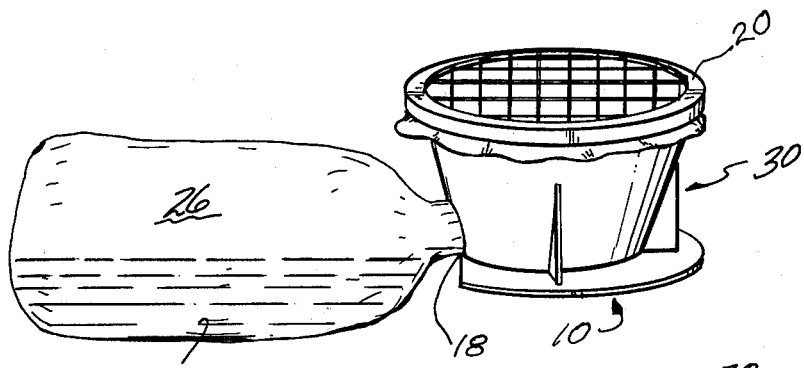
FIG. 1 is a perspective view of the present invention showing the funnel-like container, the cover member disposed on the container adjacent the top thereof, and an oil impervious bag inserted through the container and extending up over the top thereof.

Referring first to FIG. 1, the novel device 30 in its entirety is clearly shown. The device 30, in the presently preferred embodiment, comprises an inverted, hollow, frustum container 10, an oil impervious bag receptacle 26 and a cover member 20. One can see that the bag 26 is inserted through opening 18 adjacent the bottom of the container 10 and which extends upwardly in the container so as to extend over the top whereof. The cover member 20 is disposed atop the bag 26 so as to firmly hold the top of the bag adjacent the top of the contaner 10.

Figure 3:
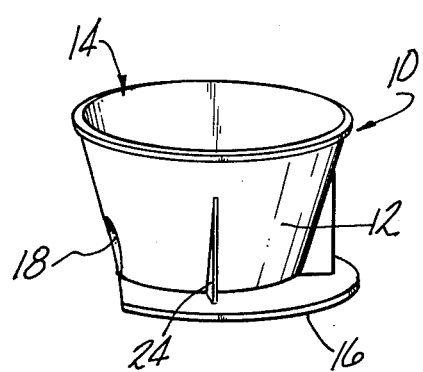
FIG. 3 is a perspective view showing the container, having an open upper top member and a closed bottom member terminating in a generally flat base.
Figure 2:
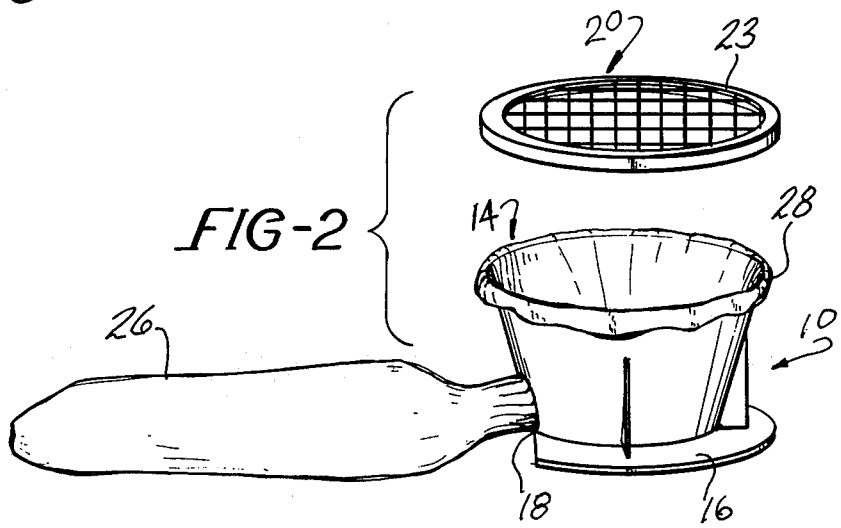
FIG. 2 is an exploded perspective veiw showing the cover member removed from the top of the container so as to illustrate the lining of the interior of the container by means of the bag-like receptacle.

Referring now to FIGS. 2 and 3, one can see that the container 10, which has a generally funnel-like configuration, has an open upper top member 14 forming a peripheral rim and a closed bottom member 16. In the preferred embodiment, the open top member 14 acts as an inlet for liquids and is disposed along the vertical axis of the container 10. Bottom member 16 extends outwardly from the container 10 and forms a substantially flat base which supports the container when in use. Bottom member 16 is coupled to the continuous side wall 12 of the container 10 by means of a plurality of supporting ribs 24. Ribs 24 add strength to the device 30 and enable such device to withstand weight being disposed atop thereof and prevent the device from being easily damaged.

Opening 18 is disposed through the side wall 12 adjacent the bottom member 16. This uniquely positioned is disposed through the side wall 12 in such a manner that oil other liquids entering through the top 14 of the container 10 flows quickly and easily out of opening 18, i.e. opening 18 acts as an outlet or discharge port. In the presently preferred embodiment, opening 18 is diagonally cut through the wall 12, and is of a sufficient size such that bag 26 is easily inserted and engaged therein. One can see by reference to FIG. 2 that bag 26 is disposed along the interior wall of container 10 so as to form a lining. The top 28 of the bag 26 is specifically designed so as to fit over the top 14 of the container 10. This configuration of top 28 is chosen such that the cover 20 is easily disposed over the top 14 and secures the bag 26 to the container 10 preventing the accidental removal of the bag 26 from the container 10.

Figure 4:
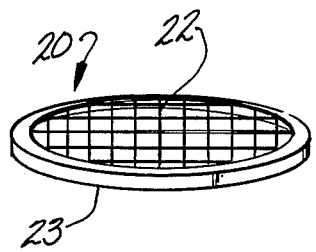
FIG. 4 is a perspective view of the cover member of the present invention showing strips of material used to form a grate.

Referring now to FIG. 4, one can see that the cover 20 which is used as a holding collar to snap over the mouth of the container 10, and to secure the bag 26 in place has a flexible rim 23 and a plurality of strips 22 of metal or other material forming a grate-like structure. Other configurations, such as, for example, spaced apart and parallel strips may also be used. In the preferred embodiment, the cover is made of a flexible plastic material such as polyethelene, nylon, etc. and the strips 22 are made of steel, plastic, or other rust impervious and oil inert material.

In use of the device of the present invention, the bag 26 is inserted into opening 18 and is pulled up from the bottom 16 to the top 14 of the container 10. The top 28 of the bag 26 is then opened and disposed over the top 14 of container 10 so as to completely be disposed over the upper periphery of the container. The cover 20 is then snapped over the top 14 so as to sandwich the bag 26 between the rim 23 of the cover 20 and the top 14 of the container 10. In this manner, the bag 26 is securely held in position. The completed device 30 is then placed under whatever is to be drained. For example, assuming that a typical oil pan located underneath an automobile is the object from which the waste liquid is to be drained. The device 30 is first disposed underneath the oil drain of the car and the oil plug is removed from the pan. As the oil proceeds out of the oil pan, it flows into the top 14 of the funnel pan. The top 14 of the container 14 is specifically designed to prevent the liquid (oil in this example) from spilling over the sides 12 of the container 10. Moreover, the liquid is channeled to proceed quickly through the container 10 by inclining the sides 12 such that the diameter of the top 14 is greater than the diameter of the bottom 16 and inasmuch as the top 14 of the container 10 is completely lined with oil impervious bag 26, no oil comes in direct contact with the container 10. This has the advantage of making clean-up as hereinafter described that much simpler. The oil proceeds through the interior section of the bag i.e. the section of the bag 26 within the container 10, and flows out through opening 18 into the exterior section of the bag 26. The waste oil is indicated in FIG. 1 by numeral 32 and occupies a bottom portion of the bag 26. While the preferred embodiment of bag 26 does not utilize an air escape opening because sufficient escape of air can be obtained through the opening 18, if necessary, bag 26 can be provided with such an air escape means. The oil 32 will collect in the bag adjacent the ground and when the oil has completely drained out of the oil pan, the oil plug is replaced to prevent any accidental drippage of oil onto the ground. Inasmuch as cover 20 is equipped with a plurality of strips 22 forming openings of a predetermined size, should the oil plug other undesirable object such as nuts, bolts and the like fall from the bottom of the car onto the cover 20, there entrance into the bag 26 is thus prevented and they will be retained on the top of the cover 20. In other embodiments, the strips of material forming openings of a predetermined size are such that only particles of a predetermined size can pass therethrough. In this configuration, the mesh size of any particles in the liquid 32 will all have a size smaller than some previously determined size. All particles larger than such size will then be trapped on the strips of material 22 of the container 20. The cover 20 can then be removed and such particles collected for proper disposal or other utility.

When the oil is completely drained into the funnel-drainer device 30, the device is then removed from underneath the car and the cover 20 is removed from the top 14 of the container 10. The top 28 of the bag 26 is then pulled together and closed so as to prevent any oil from spilling out of the bag 26. The interior section of the bag which originally lined the container, is then removed out of the opening 18. This lining has prevented the oil 32 or other waste liquid from coming into direct contact with the upward extenting sides 12 of the container 10 and therefore, the interior of the side walls 12 therefore does not need any cleaning. The bag 26 may now be easily taken to the proper disposal location thereby preventing any adverse ecological effect on the environment due to improper disposal. Moreover, because of the high cost of oil referred to hereinabove, the user may now sell the oil or other liquid 32 thereby deriving substantial economic benefits. In addition, the bag 26 is reusable and merely requires reinsertion through opening 18 in order to repeat the above referenced procedure whenever necessary and thus, cost of operation of the device of the present invention is minimal.

Figure 5:
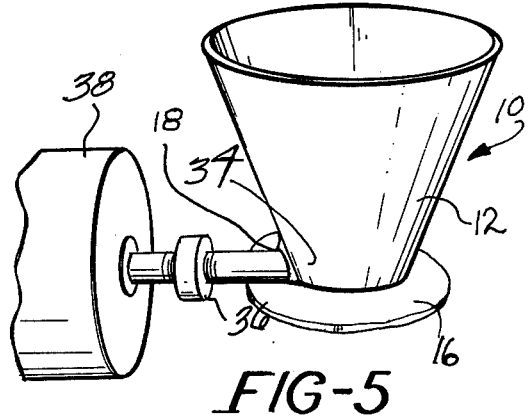
FIG. 5 is a perspective view of the device of the present invention showing the container coupled to a riqid tank by means of a pipe coupling.

Referring now to FIG. 5, an alternate embodiment of the present invention is indicated. In this embodiment, funnel-shaped container has an opening 18 disposed through the side wall 12 adjacent to the bottom 16 thereof. Extending substantially horizontally out of the opening 18 is a pipe 34 or other outlet means for permitting the oil to flow from the container 10 into a metal cylindrical tank 38. The coupling 36 is used to join the tank 38 with the container 10 and more specifically, to the pipe 34. However, it should be noted, that in this embodiment as with the embodiment with reference to FIGS. 1–4, the opening 18 is disposed adjacent the bottom 16 and is arranged and configured so as to enable oil entering the top 14 of the container 10 to substantially flow out through the pipe 34 into the tank 38, i.e. opening 18 acts as the outlet for the container 10. While such configuration with reference to FIG. 5 does not have the added advantage described with reference to the lining of the bag 26, such device has particular utility where a plurality of automobiles and the like are going to be drained, or when contained use of the device takes place for long periods. Under these conditions, tank 38 and associated means enable the continued use of the device without the need of changing bags.

The specific components of the device of the present invention may take on various configurations. For example, the bag 26 is preferably arranged and configured such that the top 28 of the bag is slightly larger than the circumference of the top 14 of the container 10. This permits the bag to be pulled through the discharge hole 18 and folded over the top 14 of the container 10. Of course, it is understood, that bags of different volumes may be used so long as the bag can be inserted through the opening 18 and extended over the top 14 of the container 10. Such a bag is preferably made of an oil and water impervious flexible plastic material such as polyethelene, polypropylene and the like.

The funnel-like container 10 can made of any rigid material and in the preferred embodiment, is made of a plastic material such as, for example, nylon, polyethelene, polypropylene and the like. One can see with reference to FIG. 3 that the difference between the container 10 of the present invention and that of a conventional household funnel is the fact that (i) the container 10 of the instant invention has a closed bottom 16 forming a substantially flat base thereby permitting the container to be stable without any additional supporting means; and (ii) the discharge hole 18 of the funnel container 10 is above the base 16 and is disposed through the side wall 12 of the funnel container 10.

The cover 20 is also made of a flexible plastic material such as nylon, polyethelene, and the like, and is preferably made of the same type of material used to make the container 10. Moreover, the strips 22 on the cover 20 may also be made of a plastic material.

Although this invention has been disclosed and described with reference to a particular embodiment, the principles involved are suseptible to other applications which will be apparent to persons skilled in the art. For example, waste liquids other than oil can be collected and stored by the device. This invention, therefore, is not intended to be limited to any particular embodiment herein disclosed.

We claim:
1. A device for collecting waste liquids and the like comprising:
    a. A self-supporting, funnel shaped container having a side wall, said side wall defining an upper inlet configured to permit said liquid to pass therethrough, closed bottom member for supporting said container, and an outlet, said outlet being provided in said side wall; and
    b. A removable receptacle for collecting said liquid, said receptacle coupled to said container adjacent said outlet such that said liquid flows through said outlet into said receptacle, said receptacle being coupled to said container by a coupling means, said coupling means for selectively coupling said receptacle to said container such that when said liquid has passed through said container and into said receptacle, said receptacle is selectively removable therefrom.

2. A device for collecting waste liquids as defined in claim 1 wherein said receptacle is a bag and extends from a position exterior to said container, through said outlet and into said container so as to form a lining therein.

3. A device for collecting waste liquids and the like comprising:
   a. A self-supporting, funnel shaped container having a side wall, an open-top member, a closed bottom member, for supporting said container and an opening disposed through said side wall adjacent said bottom member;
   b. A removable bag-like receptacle having a first section exterior to said container and a second section within said container, said bag extending through said opening and terminating adjacent said top member, said receptacle and said opening arranged and configured such that when a liquid flows into said container said liquid exits out of said opening into said exterior first section of said bag; and
   c. A cover member coupled to said container adjacent said top thereof, said cover member having a plurality of openings of a predetermined size whereby material greater than a specific size is prevented from entering said container.

4. The device for collectng waste liquids as defined in claim 3 wherein said interior second section of said bag extends over said top member and is disposed between said top member and said cover member.

5. A device for collecting waste liquids as defined in claim 3 wherein said bag is made of an oil impervious material.

6. A device for collecting waste liquids and the like comprising:
   e. An inverted hollow self-supporting frustum container having an open top member with a peripheral rim member disposed thereabout, a generally flat base member disposed on said container for closing the bottom thereof and extending outwardly therefrom for supporting said container and an opening provided in a side wall of said container adjacent said base member;
   b. A removable bag-like receptacle having a first section exterior to said container and a second section within said container, said bag extending through said opening and terminating adjacent said top member, said bag-like receptacle and said opening arranged and configured such that when a liquid flows into said container said liquid exits out of said opening and into said exterior first section of said bag; and
   c. A cover member coupled to said container and extending over said top member, said cover member and said bag being arranged and configured such that said second section of said bag is disposed between said rim member and said cover member.

7. The device for collecting waste liquids as defined in claim 5 wherein said second section of said bag lines the interior of said hollow container.

8. A device for collecting waste liquids as defined in claim 6 wherein said cover member forms a grate across said top member and prevents material greater then a predetermined size from entering said container.

* * * * *